Patented Feb. 6, 1934

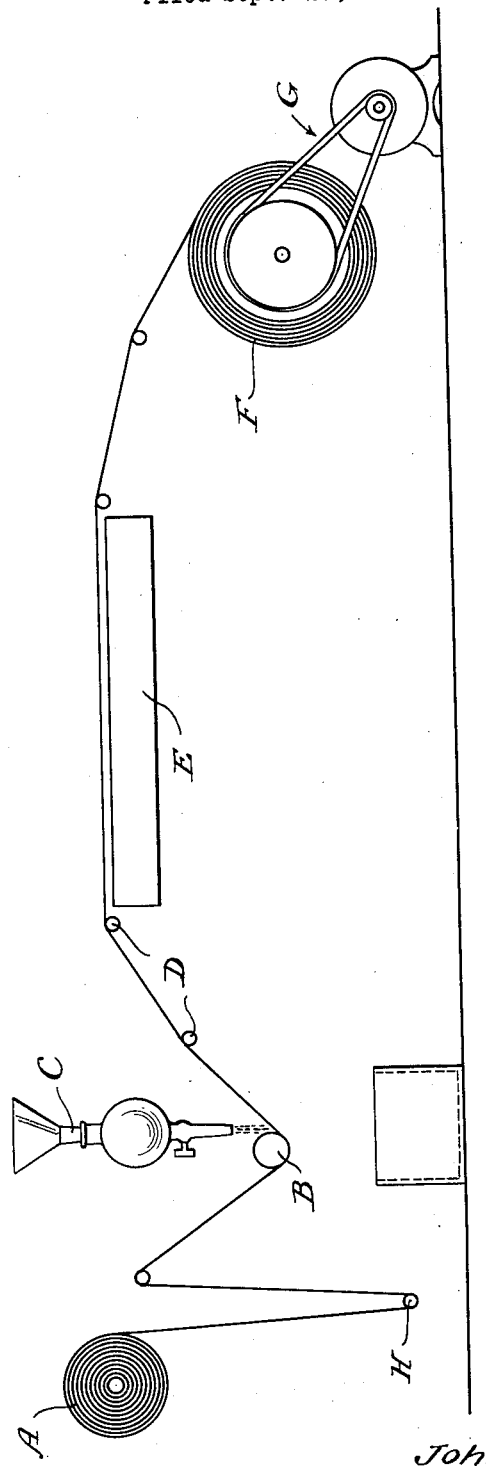

1,946,090

UNITED STATES PATENT OFFICE 1,946,090

METHOD FOR COATING FABRICS

John McGavack, Jackson Heights, N. Y., assignor to The Naugatuck Chemical Company, Naugatuck, Conn., a corporation of Connecticut Application September 27, 1928
Serial No. 308,697

13 Claims. (Cl. 18—57)

This invention relates to a method and apparatus for coating fabrics, and particularly to a method and apparatus wherein a film or layer of rubber or similar material such as balata, gutta percha, of any desired thickness, can be formed in a single continuous operation, directly from latex (artificial or natural), compounded, or vulcanized. The invention further relates to a method and apparatus for forming such a film or layer upon a flexible band, so that it either clings loosely to the band or adheres tenaciously thereto.

The general practice heretofore in spreading latex upon a fabric, has been to pass the fabric over a roll, and introduce the latex compound in front of a spreading device or "doctor blade" which rests with pressure upon the fabric. This results in considerable friction at the spreading point, requiring the latex to be of a high degree of stability to prevent coagulation. The spread fabric is then dried. By repeating this operation from 7 to 15 times it has been possible to build up a film of rubber having a gauge of about .0015 to .002". In a similar manner rubber cement films have been put on fabric but require in a usual treatment anywhere from 15 to 20 different spreading operations to put on the same weight of rubber as with the latex. It will thus be apparent that for any practical result a great number of operations are necessary each involving considerable heat in driving the water or solvent from the film, and this besides being very exacting and drastic upon the thin film, involves a consumption of much time, cost and labor. On the other hand, to obtain a thin or fairly thick sheet of vulcanized rubber without fabric the general practice has been to compound the rubber on the mill, break it down for a prolonged period so that it will run on the calender and then calender. This also taxes the rubber and involves a number of operations.

The present invention overcomes these disadvantages, is simple and easy of operation, and provides a much better film or layer of rubber in perfectly useable form. Among the objects of this invention are, by means of a single spreading operation, to provide a fabric tenaciously coated with a film or layer of rubber of any desired thickness, directly from latex, to provide a fabric loosely coated with a thin film of rubber directly from latex thus avoiding the necessity of milling and calendering, and to provide a layer of crude rubber. Also to provide a relatively thick rubber coating on any flexible material. Paper, for instance, can easily be coated with a relatively thick film of rubber in a single spreading operation directly from latex.

These objects may be attained by spreading the latex directly on a flexible material, on the egress side of a level spreader roll or member, under which the material travels and from which it is upwardly inclined and allowing the excess of latex to run off the edges of the moving material. The member which maintains the fabric level and in spread relation is preferably a rotating roll to eliminate friction in moving the fabric through the machine. As stated above, in previous spreading operations, the latex or spreading compound has been applied to the ingress side of the spreading knife or roll which smooths it out and supposedly uniformly distributes it upon the surface of the cloth. Due to the thin edge of the knife and pressure thereon only a small amount of the compound can be put on at once and hence a number of runs are necessary. Attempts to increase the thickness of the film by raising the height of the stationary spreader knife or roll have met with indifferent success, the main difficulties being non-uniformity in spreading and tendency toward coagulation and clotting at the spreader knife. In the present invention a uniform thickness of the film of rubber is put on in a single operation by the action of gravity, and as the latex does not have to pass under any spreading device or come into contact frictionally with any part of the machine, there is no tendency toward coagulation. This point is one of great value in itself in that it allows a fairly sensitive latex to be successfully used in a spreading operation. As the fabric leaves the spreading knife it proceeds quietly and uniformly over a drying means where it is dried almost completely and then wound up, if desired, on a suitable drum.

The apparatus shown generally in the drawing illustrates one form of apparatus showing how the process can be carried out. Starting on the left a roll of fabric "A" is unwound, passes under stretcher "H", over another stretcher at the top and then under the spreader roll or leveler "B", over stretchers "D", over heating unit "E" and eventually around drum "F" where it is wound up for final disposition. The movement of the fabric or other flexible material is carried out by the use of a slow speed motor and attachment listed "G". The latex is fed in through a separatory funnel or similar device "C" and this latex falls on the moving material at a point to the right of the stationary spreader roll "B"

or similar device. The heating coils "E" are arranged so as to produce sufficient heat to dry the fabric not too rapidly as it passes over its surface. Without departing from the main principle involved in this process, various modifications will suggest themselves. For instance, instead of passing the fabric over a flat drying surface, the fabric can be passed around a heated large circular drum, or the surface of this drum may be porous and vacuum applied from the inner side, thus removing water from the fabric side of the film. However in all of these modifications the distinctive feature of the invention is to be incorporated, i. e. the gravity idea of spreading the latex compound on the egress side of the spreader instead of the ingress side. The particular advantage of the process consists in the fact that instead of requiring 7 to 15 different spreading operations in putting on .0015 to .002" gauge of rubber, but one operation is necessary, and by this one operation thickness up to .006" and .007" can readily be obtained. In general the amount of rubber material to be put on is dependent upon the speed of spreading, on the thickness of the fabric where it is to adhere to the fabric, on the composition of the latex, its viscosity and surface tension,—even the total solid content of the latex is a factor—,on the angle of inclination of the fabric from the leveler, and the drying facilities used. The amount put on the fabric will also vary with the kind of fabric used, for with a repellent fabric thinner films are obtained than with a water absorptive fabric. With these contingent variables in mind it is apparent conditions can be modified so that they will be suitable for the purpose intended.

Where it is desired to prepare a thin sheet of rubber distinct from the fabric, the fabric must be latex repellent, as any substantial adhesion would prevent the removal of the rubber film from the fabric. This can be accomplished by passing the fabric through some coagulating bath, squeezing most of the coagulant off, and then depositing the latex compound as stated in the present invention. The coagulants used for thus rendering the fabric non-adhesive can be varied over a considerable range. Among those which are most useful may be mentioned (1) a mixture of equal parts of methyl alcohol and acetic acid (2) 5 to 10% solutions of aluminum sulphate (3) 5% solutions of calcium chloride. If the fabric is passed through any one of these different baths, partially dried or squeezed, prior to the introduction of the latex, then the dried film will readily strip from the fabric and the sheet is readily obtained. It is clear that the sheet or layer of rubber may be used in the manufacture of any suitable rubber article as by rolling or otherwise forming into the desired article, for instance inner tubes of substantially uniform thickness may be made by winding the layer of coagulated or partially coagulated latex on a pole or mandrel, preferably before the layer is too dry, and vulcanizing before or after splicing in the usual manner. In fact any rubber article may be made in which it is desired to have a thick film or layer of uniform thickness by employing the gravity spreading principle of this invention.

Where the preparation of crude rubber from latex is desired, the latex, uncompounded, is introduced on the egress side of the spreader, after the fabric has been passed through a coagulating bath. The dried film of rubber is then wound upon a drum and cut into slabs or compressed, as may be desired.

In brief the process consists in using the novel idea of gravity spreading, that is spreading latex on the fabric by the employment of gravity alone, drying same through a suitable device and recovering the latex as an adhering film of rubber on fabric or as a rubber film or layer in itself. Besides the uses already named the invention can be employed in the preparation of raincoat stocks and also for coating paper stocks.

With the detailed disclosure above given it is obvious that modifications will suggest themselves and it is not desired to limit the invention otherwise than as set forth in the appended claims.

Having thus described my invention, what I claim and desire to protect by Letters Patent is:

1. The process of forming a film or layer of rubber or similar material which comprises spreading latex material on an inclined upwardly moving band under the action of gravity opposed to the movement of the band.

2. The process of forming a film or layer of rubber which comprises spreading latex material on an inclined upwardly moving band under the action of gravity opposed to the movement of the band, then drying said material, thereby recovering a film or layer of rubber of desired thickness in a single continuous operation.

3. The process of coating a fabric with latex material which comprises supplying said material directly to the fabric, and spreading said material as a uniform film or layer by the action of gravity while moving the fabric in an upwardly inclined direction against such action.

4. The process of forming a film or layer of rubber or similar material which comprises spreading latex material in the presence of a coagulant on an inclined upwardly moving band under the action of gravity opposed to the movement of the band.

5. The process of forming a film or layer of rubber or similar material upon a fabric which comprises supplying latex material directly to the fabric in the presence of a coagulating agent, and spreading said latex material as a uniform film or layer by the action of gravity while moving the fabric in an upwardly inclined direction against such action.

6. The process of forming a film or layer of rubber upon a fabric which comprises supplying latex material directly to the fabric in the presence of a coagulating agent, and spreading said latex material as a uniform film or layer by the action of gravity while moving the fabric in an upwardly inclined direction against such action, and drying the film or layer to produce a rubber coated fabric in a single continuous operation.

7. The process of forming a film or layer of rubber or similar material which comprises treating a flexible moving band with a coagulant, supplying latex material to said band, spreading said material by the action of gravity while moving the band against such action, drying the material, and stripping the film or layer from the band.

8. The process of forming a film or layer of rubber or similar material of predetermined thickness in a single continuous operation, which comprises supplying an excess of latex material to an inclined upwardly moving band, spreading the latex upon said band under the action of gravity while moving the band against such action.

9. The process of forming a film or layer of rubber or similar material which comprises treating a flexible moving band with a coagulant, partially removing the coagulant, supplying latex material to said band, spreading said material by the action of gravity while moving the band against such action, drying the material, and stripping the film or layer from the band.

10. A process of forming a film or layer of rubber or similar material which comprises spreading a latex compound under the influence of its own weight upon an upwardly moving inclined carrier for the latex compound.

11. A process for forming a film or layer of rubber or similar material which comprises passing a carrier for the rubber under a spreader and in an upwardly inclined direction from the spreader, and supplying a coherent flow of latex compound to the inclined carrier surface on the egress side of said spreader.

12. The process of forming a film or layer of rubber or similar material which comprises treating a moving band with a coagulant, supplying latex material to said band, spreading said material by the action of gravity while moving the band against such action, and stripping the film or layer from the band.

13. The process for producing a film or layer of vulcanized rubber which comprises treating the surface of a travelling base with coagulant, introducing a latex compound containing vulcanizing ingredients upon the surface of said treated base, spreading the latex compound in the form of a film or layer under its own weight by the action of gravity while moving the base material against such action, and subsequently stripping the film or layer from the base and recovering a layer of vulcanized rubber.

JOHN McGAVACK.